(12) United States Patent
Maru

(10) Patent No.: US 7,289,475 B2
(45) Date of Patent: Oct. 30, 2007

(54) HIGH-SPEED CELL SEARCH SYSTEM FOR CDMA

(75) Inventor: Tsuguo Maru, Tokyo (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 09/916,276

(22) Filed: Jul. 30, 2001

(65) Prior Publication Data

US 2002/0031109 A1   Mar. 14, 2002

Related U.S. Application Data

(62) Division of application No. 09/098,415, filed on Jun. 16, 1998.

(30) Foreign Application Priority Data

Jun. 16, 1997 (JP) .............................. 1997-158460

(51) Int. Cl.
H04B 7/216 (2006.01)
(52) U.S. Cl. ...................... 370/335; 370/342; 370/208
(58) Field of Classification Search ................ 370/335, 370/342, 208, 229, 331, 441, 201, 203, 204, 370/205, 206, 207, 479
See application file for complete search history.

(56) References Cited

U.S. PATENT DOCUMENTS

| | | | |
|---|---|---|---|
| 5,495,509 A | 2/1996 | Lundquist et al. | |
| 5,577,025 A | 11/1996 | Skinner et al. | |
| 5,799,038 A | 8/1998 | Nowara et al. | |
| 5,883,899 A * | 3/1999 | Dahlman et al. | 370/468 |
| 5,896,368 A * | 4/1999 | Dahlman et al. | 370/335 |
| 5,978,412 A | 11/1999 | Takai | |
| 5,982,763 A | 11/1999 | Sato | |
| 6,061,359 A | 5/2000 | Schilling et al. | |
| 6,064,688 A | 5/2000 | Yanagi | |
| 6,078,576 A | 6/2000 | Schilling et al. | |
| 6,101,175 A | 8/2000 | Schorman et al. | |
| 6,104,748 A | 8/2000 | Kaku | |
| 6,128,288 A | 10/2000 | Miya | |
| 6,128,332 A * | 10/2000 | Fukawa et al. | 375/146 |
| 6,130,884 A * | 10/2000 | Sato | 370/335 |
| 6,137,773 A * | 10/2000 | Stilwell et al. | 370/209 |
| 6,424,619 B2 * | 7/2002 | Odenwalder et al. | 370/209 |
| 6,765,895 B1 * | 7/2004 | Watanabe | 370/335 |
| 2005/0265430 A1 * | 12/2005 | Ozluturk et al. | 375/145 |

* cited by examiner

Primary Examiner—Ajit Patel
(74) Attorney, Agent, or Firm—Young & Thompson

(57) ABSTRACT

In a high-speed search system for CDMA, plural (M) symbols which are subjected to spread frequency coding with a spreading code called as a short code are prepared when synchronization of the spreading code is established before synchronization of carrier is established in a mobile station used in a CDMA cellular system, data which are obtained by forming an orthogonal code with the polarities of the M symbols are set as a down signal, and when the orthogonal code concerned is detected, coherent integration is performed by a correlator having combinations of the polarities which can be possibly taken by the code over the plural symbols (of M) constituting the code.

13 Claims, 10 Drawing Sheets

FIG.2

| SYMBOL (ORTHOGONAL CODE) | POLARITY OF SYMBOL ADDITION (RING BUFFER) | CORRESPONDING DATA |
|---|---|---|
| 1111 | + + + + | 11 (HEADER) |
| 1010 | + + + + | 10 |
| 1100 | + + − − | 01 |
| 1001 | + − − + | 00 |

F I G.6
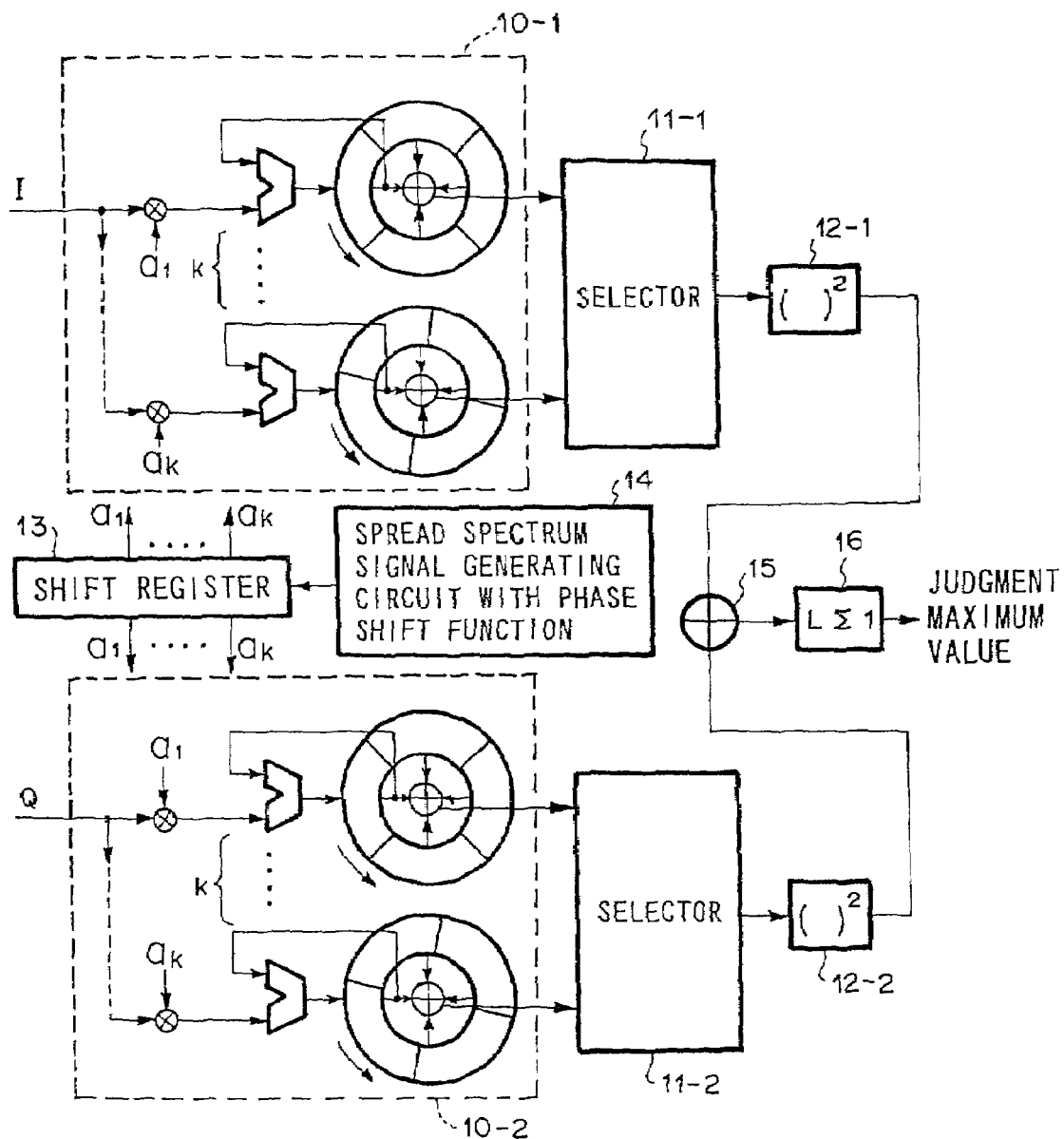

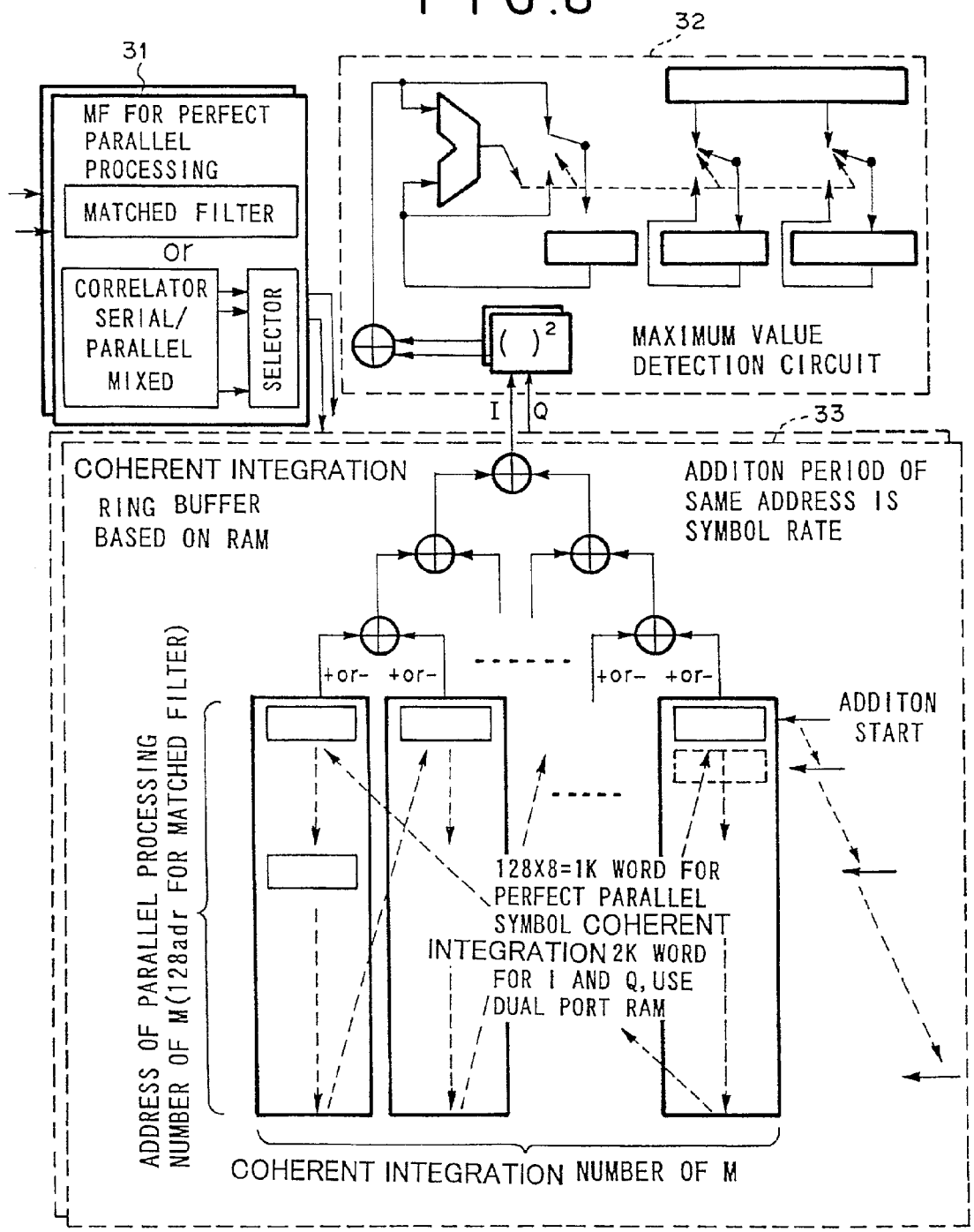

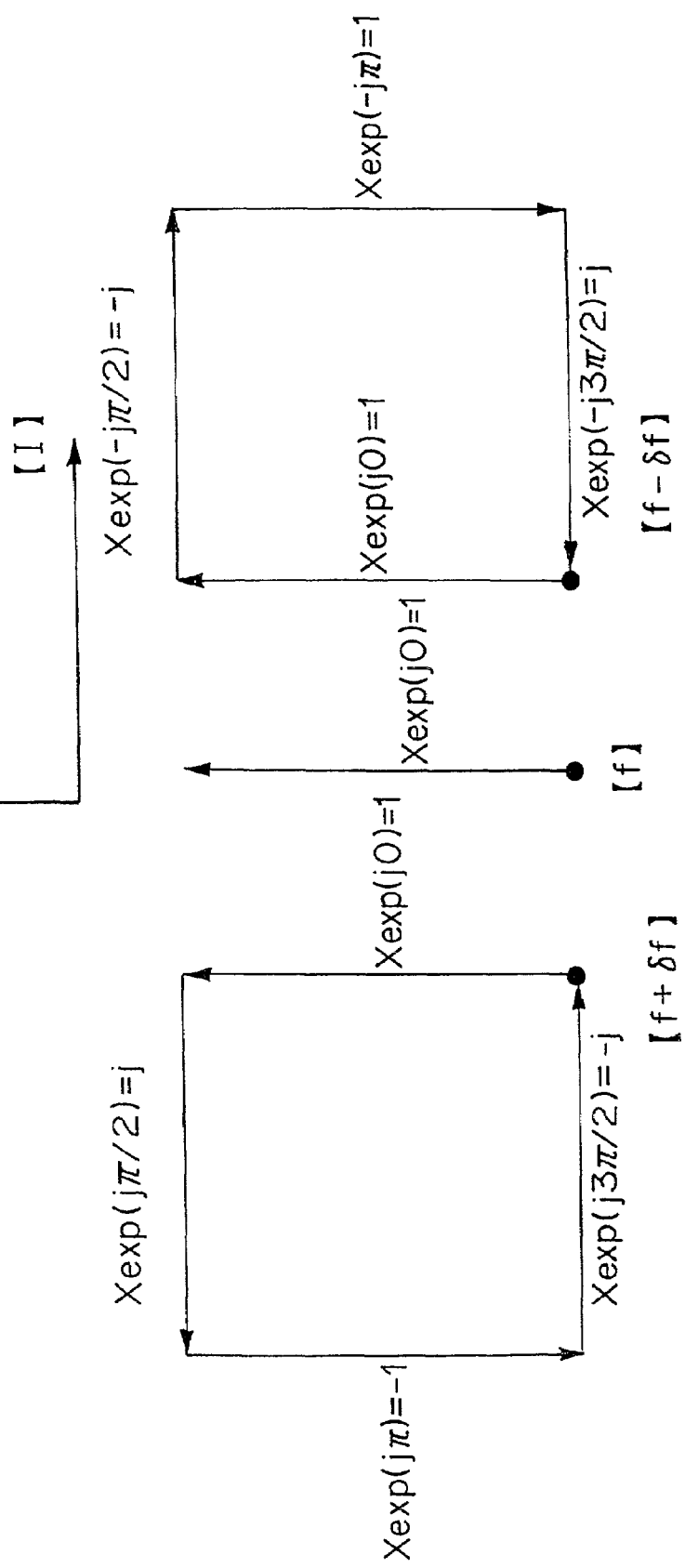

FIG. 10

| TIME (PHASE) / FREQUENCY DEVIATION | $f+\delta f$ | | $f$ | | $f-\delta f$ | |
|---|---|---|---|---|---|---|
| | I | Q | I | Q | I | Q |
| $t_0$ : 0 | a | b | a | b | a | b |
| $t_1$ : $\pi/2$ | -b | a | a | b | b | -a |
| $t_2$ : $\pi$ | -a | -b | a | b | -a | -b |
| $t_3$ : $3\pi/2$ | b | a | a | b | -b | a |

● CARRIER FREQUENCY DEVIATION COHERENT INTEGRATION $[f+\delta f]$   I : $I(t=t_0) - Q(t=t_1) - I(t=t_2) + Q(t=t_3)$ Q : $Q(t=t_0) + I(t=t_1) - Q(t=t_2) - I(t=t_3)$ $[f]$   I : $I(t=t_0) + I(t=t_1) + I(t=t_2) + I(t=t_3)$ Q : $Q(t=t_0) + Q(t=t_1) + Q(t=t_2) + Q(t=t_3)$ $[f+\delta f]$   I : $I(t=t_0) + Q(t=t_1) - I(t=t_2) - Q(t=t_3)$ Q : $Q(t=t_0) - I(t=t_1) - Q(t=t_2) + I(t=t_3)$

HIGH-SPEED CELL SEARCH SYSTEM FOR CDMA

BACKGROUND OF THE INVENTION

1. Field of the Invention

The present invention relates to a high-speed cell search system for CDMA, and a high-speed search circuit for use in a CDMA (Code Division Multiple Access) communication system having larger interfering wave component power than target signal component power, and more particularly to a high-speed cell search system in which S/N (Signal/Noise) is increased by performing coherent integration over plural signals for search, and identification and screening of long codes are performed by using an orthogonal code.

2. Description of the Related Art

In a CDMA cellular system, a mobile station must establish synchronization of a spreading code sequence before it establishes synchronization of carrier and clocks. It may take long time to establish the code synchronization, and it is a critical problem for CDMA to shorten this time. Specifically, the conventional CDMA cellular system has the following two problems.

A first problem is as follows. That is, the mobile station performs a cell search for detecting a connection cell on the assumption of an estimation method of initial synchronization of spreading codes.

Conventionally, in an inter-base-station synchronization system which is represented by IS-95, the respective base stations synchronously operate in cooperation with one another on the basis of a predetermined offset amount, and thus each base station 1 can perform the cell search work by using only one type of spreading code even when it moves from one base station to another base station, so that the search time can be shortened.

However, in order to use this method, the base stations are required to be synchronized with one another, and in order to satisfy this requirement, a system for generating a reference synchronous signal to establish external synchronization between the base stations is separately needed.

Therefore, an inter-base-station asynchronous system which needs no external system has been required. However, each base station cannot have one common spreading code because the base stations are asynchronous therebetween. Therefore, the respective base stations have different kinds of spreading codes, and thus all kinds of spreading codes must be searched in a process of acquiring and following the initial synchronization, resulting in increase of the search time.

A second problem is as follows. A method of acquiring synchronization and following synchronization on the basis of an coding gain by a Viterbi processor provides high-quality data on convolution-encoded information. However, at the time when the synchronization of the spreading code sequence is established, the Viterbi processor does not operate because it is before data are read in, and thus the detection is performed in the state that there is no coding gain. Since nothing is started (for example, no carrier synchronization is started) unless the synchronization establishment is completed, it is necessary to perform the detection with high quality even when there is no coding gain. That is, if there is some probability that erroneous detection occurs, the repetition of the search work would occur, resulting increase of the search time.

SUMMARY OF THE INVENTION

The present invention relates to a search system for use in CDMA having big interference compared with target signal power, and more particularly to a cell search of a long-code mask system for performing high-speed search by using a long-code mask symbol which is subjected to spread spectrum coding with only a short code.

According to the long-code mask system, in a CDMA inter-base-station asynchronous cellular system, symbols which are subjected to the spread spectrum coding with a long code are masked in a fixed period to provide symbols (mask symbols) which are subjected to the spread spectrum coding with a short code, and a mobile station implements a high-speed cell search by using the mask symbols (disclosed in "Technical Reports RCS 96-74 of Radio Communication System Research of Electronics Information Communication Associates).

According to the long-code mask system which has been open to the public until now, the timing of the long code is detected by utilizing the mask symbol based on the short code, and then the long code is identified by using a normal sliding correlator. Accordingly, for example, when the number of users is increased to magnify interfering wave power, the probability that the erroneous detection occurs is increased, and the repetition of the search occurs, resulting in increase of the search time. Further, when the number of long codes to be identified is increased, the search time is also increased.

On the other hand, according to the present invention, identification or screening of a long code is enabled by L-time repetition of M mask symbols of the long code (L<M). Further, coherent integration is performed over M symbols to enhance SNR (Signal-to-Noise Ratio), and specification or screening of the long code is performed at an early stage while reducing the error-occurring probability, thereby implementing the high-speed cell search.

Further, according to the present invention, in a CDMA system which implements the inter-base-station asynchronous system by performing the spread spectrum coding every base station on the basis of codes which are called as "long codes inherent to the base stations", data comprising orthogonal codes which are constructed by M symbols are added with information for specifying a base station, and the screening or specification of the long code is performed on the basis of the information, so that the high-speed cell search can be implemented.

Further, the present invention is applicable to orthogonal demodulation having I-system and Q-system, and the higher-speed cell search can be performed by performing power addition after the coherent integration is performed.

Still further, the present invention can be implemented with a small scale of circuit by a ring buffer for performing an adding operation with the polarity corresponding to an orthogonal code, so that the present invention is suitably applicable for power save.

According to the present invention, a Barker sequence is used to specify the frame position, and thus data constructed by orthogonal codes can be prevented from being erroneously detected as a frame synchronization signal.

The present invention is applied to a serial search, a parallel search or a serial/parallel mixed search, and a parallel degree, that is, a search detection time can be selected in accordance with an achievable circuit scale, thereby making the design flexible.

According to the present invention, by providing redundancy to data which are constructed by the L-time repetition of the orthogonal codes based on M symbols, data for specifying a long code which is defected due to fading or the like can be restored, thereby reducing the retry frequency of search and shorten the search time as a whole.

Further, according to the present invention, the synchronization of the spreading code sequence is required to be established before the carrier and clock synchronization is established, however, the high-speed search can be performed by performing the coherent integration corresponding to the frequency deviation with a relatively small-scale circuit even in the state that there is a carrier frequency deviation.

A search system for CDMA according to the present invention is characterized in that plural (M) symbols which are subjected to spread frequency coding with a spreading code called as a short code are prepared when synchronization of the spreading code is established before synchronization of carrier is established in a mobile station, data which are obtained by forming an orthogonal code with the polarities of the M symbols are set as a down signal, and when the orthogonal code concerned is detected, coherent integration is performed by a correlator having combinations of the polarities which can be possibly taken by the code over the plural symbols (of M) constituting the code.

Further, in a CDMA system which implements an inter-base-station asynchronous system on the basis of a code called as a long code inherent to a base station, data constructed by the orthogonal code contain information to specify a base station, and specification or screening of a long code is performed on the basis of the information.

Still further, in the present invention, one code of the orthogonal codes is used as a header.

In the present invention, the symbol data of M which are received on the basis of the combination of the polarities determined by the orthogonal codes are added in the in-phase component and the quadrature component, an orthogonal vector which is received on the basis of the square sum thereof or the maximum value of the amplitude component is specified, and the screening or identification of the long code is performed on the basis of the data obtained by the L-time repetition of the above processing.

Further, in the present invention, an M-tap ring buffer which performs addition with the polarities corresponding to the orthogonal codes in each of the I-system and the Q-system is provided, the content of the ring buffer is renewed at a symbol rate and the addition result is used to specify an orthogonal vector.

Still further, in the present invention, a Barker sequence is used to specify the frame position of the M symbols.

In the present invention, the above function is applied to serial search, parallel search or serial/parallel mixed search.

In the present invention, redundancy is provided to codes which are formed by L-time repetition of an orthogonal vector to provide a function of restoring a portion which cannot be detected.

Further, in the present invention, in the coherent integration operation of the M symbols, a sequence which is weighted and polarized on the assumption of the carrier frequency deviation is prepared, and the maximum one is selected on the basis of the correlation thereof, thereby supporting coherent integration having frequency deviation.

Still further, in the present invention, in the coherent integration operation of the M symbols, when a sequence which is weighted and polarized on the assumption of the carrier frequency deviation is prepared, the approximation is performed by using only the polarities.

BRIEF DESCRIPTION OF THE DRAWINGS

FIG. 2 is a table showing the relationship between symbol addition and orthogonal code;

FIG. 6 is a diagram showing a second embodiment of a cell search circuit when the present invention is applied to orthogonal detection;

FIG. 8 is a diagram showing a search circuit with an coherent integration function using RAM;

FIG. 9 is a diagram showing a symbol addition polarity correction rotational feather of carrier frequency deviation supporting coherent integration; and FIG. 10 is a symbol addition polarity correction table of the carrier frequency deviation supporting coherent integration.

DETAILED DESCRIPTION OF THE PREFERRED EMBODIMENT

A preferred embodiment according to the present invention will be described hereunder with reference to the accompanying drawings.

Figure 1:
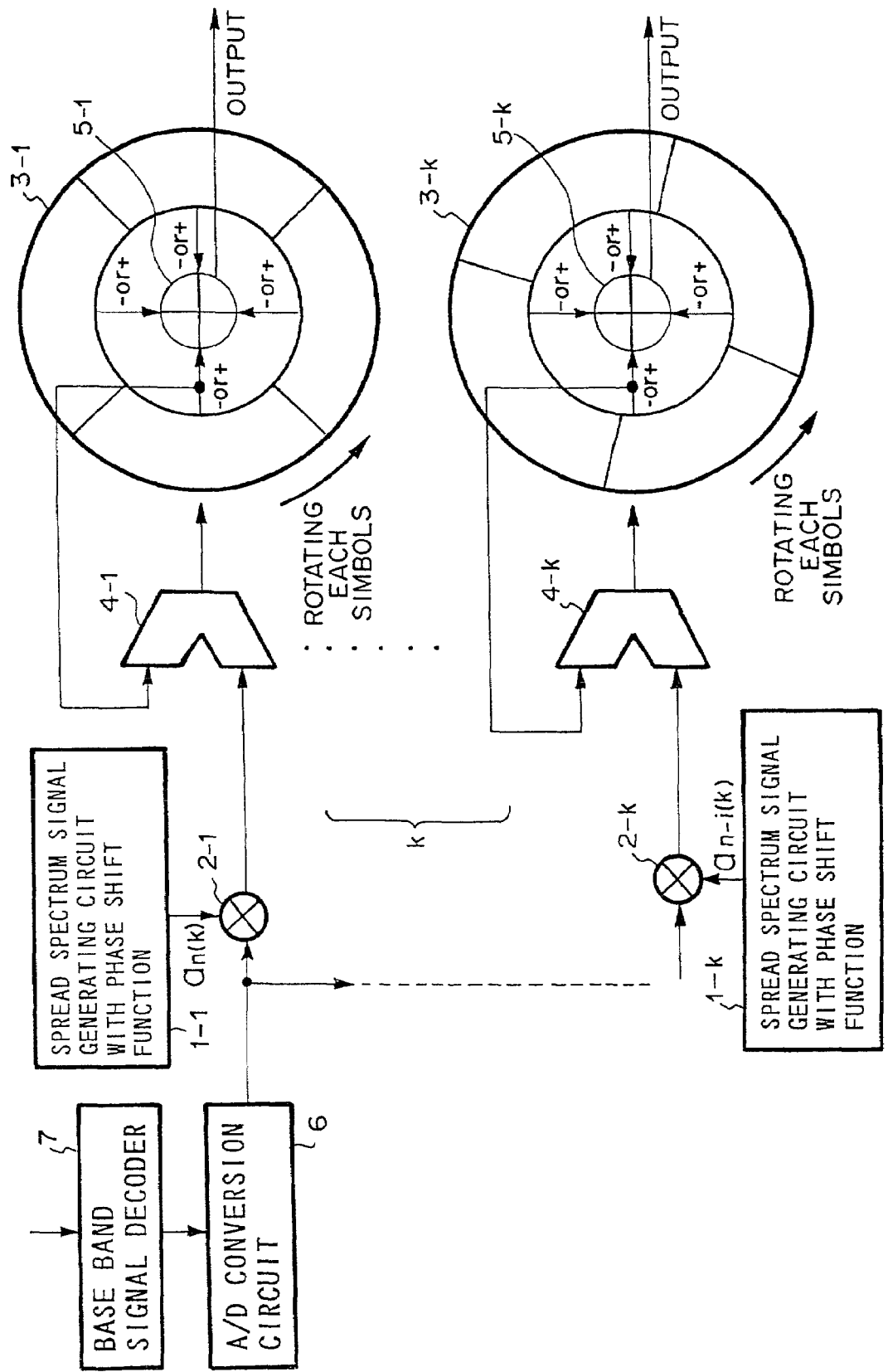
FIG. 1 is a diagram showing a first embodiment using a high-speed cell search system in a CDMA communication system of the present invention.

FIG. 1 is a diagram showing a first embodiment using a high-speed cell search system in a CDMA communication system according to the present invention.

In FIG. 1, a spread spectrum signal is input to a base band signal decoder 7 to decode the spread spectrum signal to a base band signal, and then the base band signal is input to an A/D converter 6 to be converted to a digital signal. The reception signal after the A/D conversion is multiplied by the output an(k) of a spread spectrum signal generating circuit 1-1 with a phase shift function to perform an despread spectrum coding. The multiplication result is stored in an accumulator which comprises an adder 4-1 and a one-signal buffer of a ring buffer 3-1, thereby implementing a function of performing time integration in an unit signal cascade time period before the spread spectrum coding. The signal before the spread spectrum coding is not varied during an unit signal section, and thus the despread time integration result becomes a signal before the spread spectrum coding.

Figure 3:
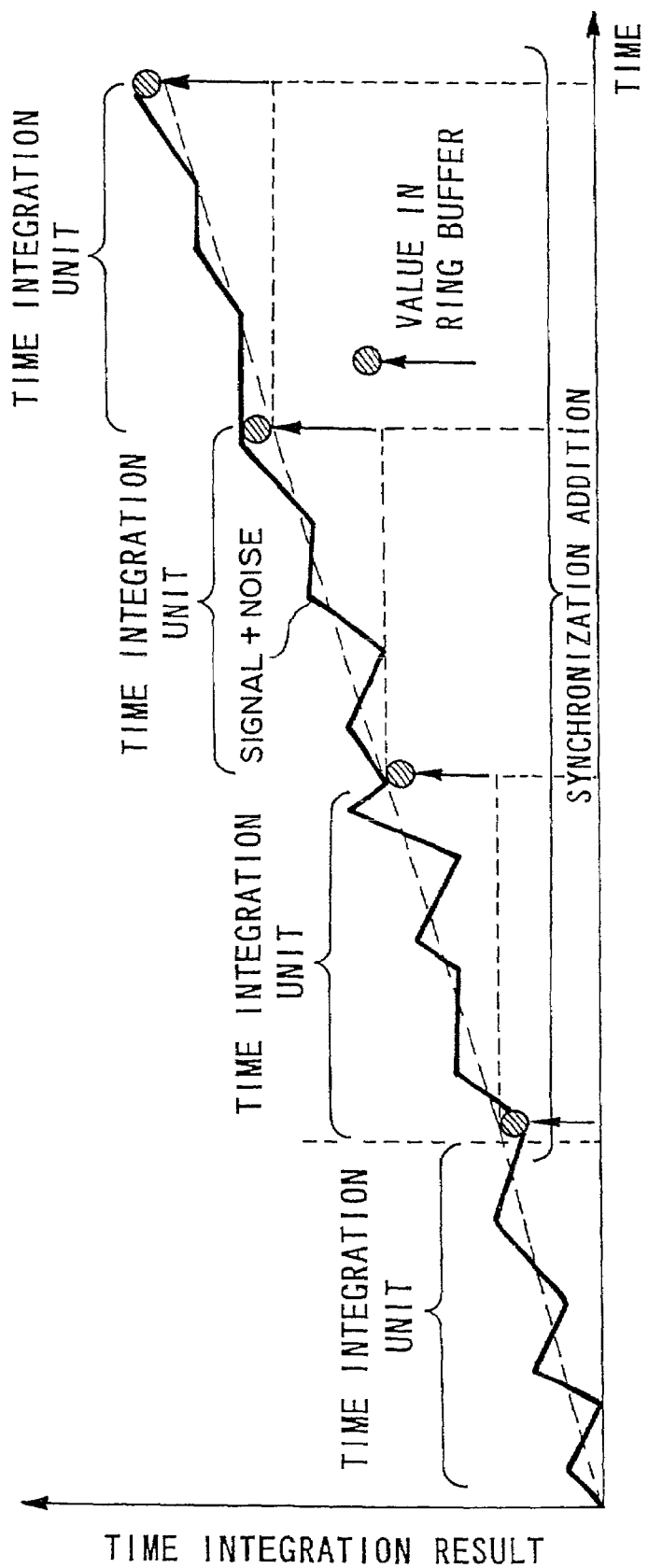
FIG. 3 is a diagram showing a signal status based on time integration and coherent integration per unit signal.

A first part of FIG. 3 represents a timing chart representing the above state. In FIG. 3, the time integration per unit time is accumulated with time lapse, and a noise component is also integrated. However, the increase of the noise component is smaller than that of the signal component, and this enhances the SNR.

Returning to FIG. 1, the operation of performing the time integration over unit signal as described above is also performed on a next signal in the same manner. However, at this time, the ring buffer is rotated and the integration result is accumulated in a new buffer. The operation is also performed on M of the ring buffer. When the final integration operation is completed, the symbol addition on the content of each buffer is performed according to the polarities shown in FIG. 2. FIG. 2 shows an example of the relationship between the polarity of the symbol addition and the orthogonal code, and it shows a case for M=4. When the same operation is applied to each orthogonal code shown in FIG. 2, the addition result is maximum at the time when the patter of M signals before spread spectrum coding is coincident with the combination pattern of the polarities. FIG. 3 shows the time integration state under the coincidence between these patterns. In FIG. 3, those portions which are represented by black dots and arrows represent the integration result accumulated in the buffer. FIG. 3 shows the aspect that SNR is enhanced by performing the addition operation at M times. Here, FIG. 3 shows the signal status based on the time integration and the coherent integration per unit signal. As shown in FIG. 2, corresponding data are allocated to each orthogonal code, and the corresponding data can be identified by detecting the maximum value. By this operation, that is, the coherent integration, in the data accumulated in each buffer, the power of the addition result is represented by the following equation due to statistical independence:

$$E[\{X_1+X_2+\ldots+X_M\}^2]=E[X_1^2+X_2^2+\ldots+X_M^2]=M*E[X^2]\ldots(1)$$

Here, the random variables $X_1$, $X_2$, ..., $X_M$ has the probability distribution, and they are represented by X.

Since the power of the addition result of the signal S is $M^2S^2$, if it is converted to the level, it is found out that the signal component is increased by M times and the noise component is increased by $M^{1/2}$ times through the addition operation at M times, so that the SN ratio is enhanced by $M^{1/2}$ times.

In the case of the CDMA communication system, the noise component is larger than the signal component, and an expected SN ration cannot be obtained by merely performing the time integration at the same level as the unit signal duration before the spread spectrum coding. However, by the above method, the SN ration can be increased by $M^{1/2}$ times, and thus the judgment for the synchronism acquisition of the spread spectrum signal can be implemented.

Next, the operation of acquiring the synchronization of the spreading code on the basis of the judgment result will be described.

In FIG. 1, the serial search and the parallel search are mixed with each other with the parallel number set to k in order to shorten the search time. In FIG. 1, a parallel-arranged k-th block is illustrated, and k blocks having the same construction are arranged to form one search circuit. Each of spread spectrum signal generating circuits with phase shift function 101 to 1-k has a fixed phase shift, and the addition start position for the unit signal of each of the ring buffers 3-1 to 3-k is also shifted due to the above phase shift. Accordingly, the synchronization acquisition of the spreading code can be performed on the basis of the maximum value of the correlation value corresponding to each correlator.

FIG. 6 is a diagram showing the overall construction when the CDMA cell search circuit of the present invention is applied to orthogonal detection. In FIG. 6, 10-1, 10-2 represents the same cell search circuit as used in the first embodiment of FIG. 1. Selectors 11-1 and 11-2 are used to select an addition output of the ring buffer, and it is set to be selected when each ring buffer is in full state. At this time, if an amount of phase shift in unit signal length+phase shift of unit symbol length is given to the timing of each ring buffer addition and the spreading code for the ring buffers of k, it is available to disperse the load of the processing of the sectors and subsequent stages. Multipliers 12-1 and 12-2 and an adder 15 are used to take the square sum of each of I and Q and detect the power. A shift register 13 and a spread spectrum signal generating circuit with phase shift function 14 are used to supply the multipliers in the cell search circuits 10-1 and 10-2 with the spreading code for despread coding. In this embodiment, each of the in-phase component and the quadrature component uses BPSK(Binary Phase Shift Keying) spread spectrum coding using the same spreading code, and thus the spreading codes a1 to ak from the shift register are commonly used. Further, a1 to ak are obtained by phase-shifting the same code, and thus they are supplied from the shift register while varying the phase thereof.

The signal which is converted to power by the square addition of I, Q after the synchronization addition of M is performed as described above, is subjected to power addition over L frames by an L-frame power adder 16, thereby suppressing the effect of Rayleigh's fading.

At this time, it is needless to say that an absolute value circuit is used in place of the power conversion in the power detection to suitably reduce the circuit scale.

Figure 4:
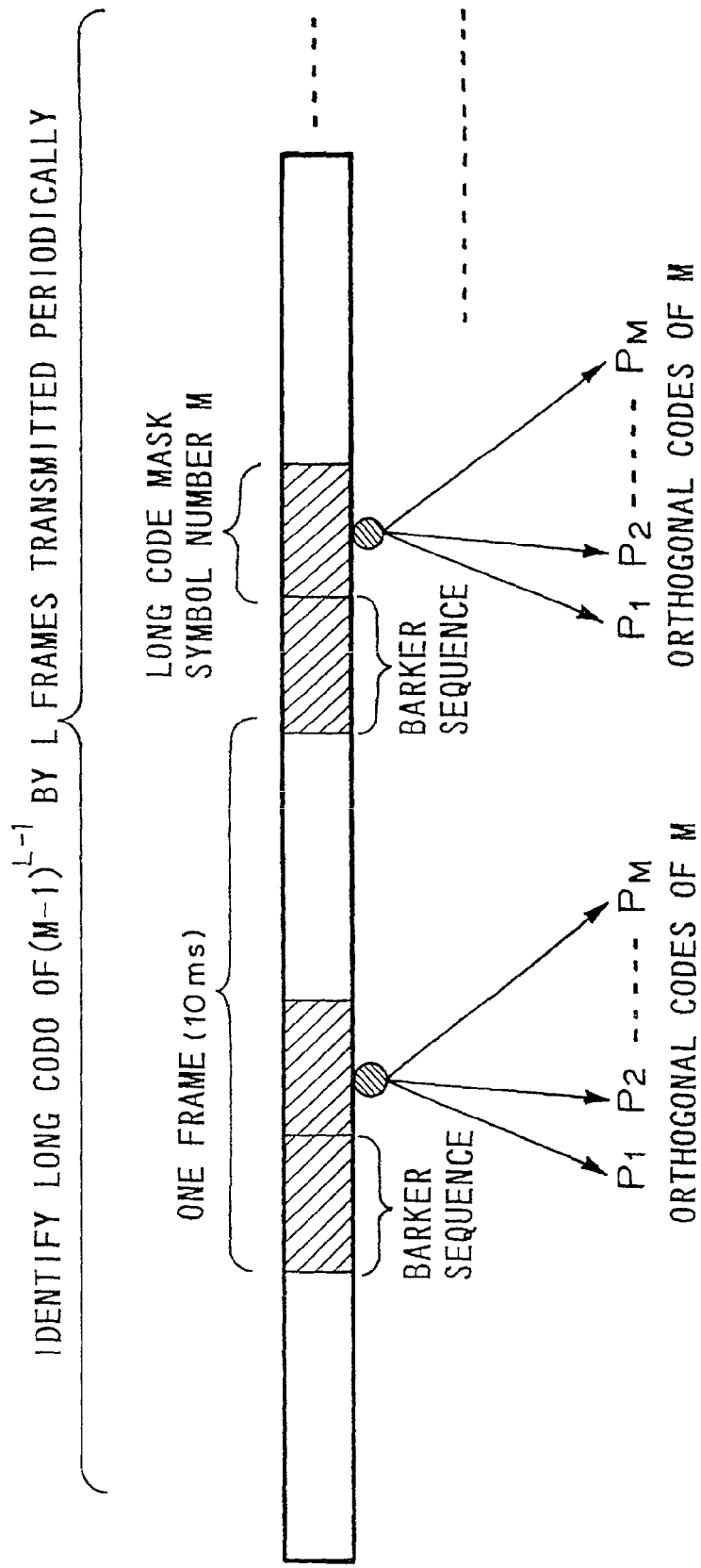
FIG. 4 is a diagram showing the frame construction.

The orthogonal code is received as described above, and the frame construction thereof is shown in FIG. 4.

The present invention relates to the high-speed cell search in the inter-base-station asynchronous system, and base stations use different types of spreading codes. Therefore, all the types of spreading codes are searched in the initial synchronization process. If this operation is directly carried out, the search time is necessarily induced. Therefore, the high-speed search is performed by using long-code mask symbols which are subjected to the spread spectrum coding with only short codes. The hatched portion of the frame construction of FIG. 4 represent long-code mask symbols.

In this embodiment, an orthogonal code constructed by M symbols is periodically transmitted, and information to screen (or specify) one long code is represented by L frames. One of the L frames is used as a header of the information, and long codes of $(M-1)^{L-1}$ can be identified. Further, the orthogonal code uses a part of the frame, and a correlation appears at a symbol interval in the long code mask symbols. Therefore, the specifying precision of the position in the frame of the M symbols can be enhanced by using a Barker sequence having a sharp auto-correlation. FIG. 4 shows the frame construction at this time. When the L frames of the M orthogonal codes are detected, the timing of the short code, the timing of the long code and the identification of the long code are achieved, and thus the correlation detection of the long code can be performed on the basis of the above factors. Therefore, the long code candidates can be screened at an early stage by transmission of long code candidate information in the long code mask symbol.

Here, since the cell search just after power is turned on is under initial synchronization, the detection is required to be performed in the state that phase shift of carrier is appended. Accordingly, the polarity of the received symbol is unknown. However, according to the present invention, an orthogonal vector such as Hadamard's matrix, Walsh matrix or the like of the M symbols is assigned as the M symbols, and thus the detection can be performed even with being accompanied by the phase deviation of carrier. The position of the M symbols of L may be assigned every frame as in the case of FIG. 4, or they may be collectively arranged within one frame.

Figure 5:
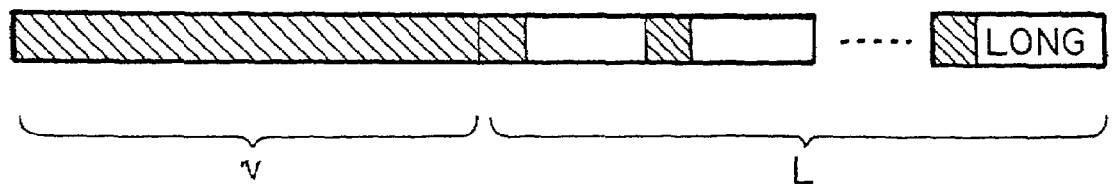
FIG. 5 is a timing chart when long-code identification is performed by L-time repetition of an orthogonal code of M symbols.

FIG. 5 shows the aspect of the identification of the long code as described above. In FIG. 5, a first section of v symbols represents a section in which the short-code synchronization is established, and the first orthogonal code is detected in this section. Subsequently, the residual orthogonal codes of L−1 is detected in a section of L symbols. On the basis of the information, the identification of the long code is finally performed.

The following equation (2) represents the time to examine all the states of one frame period when the serial/parallel mixed cell search is performed from FIGS. 1 and 5:

$$v = (P * S/C) * 10 \ [ms]$$

Here, P represents the short-code period, C represents the number of parallel processing of the correlator, S represents the number of samples per chip, and one frame length is set to 10 ms.

Accordingly, the number C of the parallel processing can be flexibly selected in accordance with the restriction due to the circuit scale and the demanded search time. Further, the redundancy may be provided to the long code information based on the orthogonal codes of the M symbols to restore those portions which cannot be detected due to fading during the detection of L, thereby enhancing the resistance to fading.

As an example, for v=8 (80 ms) and L=10, the search time is equal to (8+10)*(10 ms)=180 ms.

Figure 7:
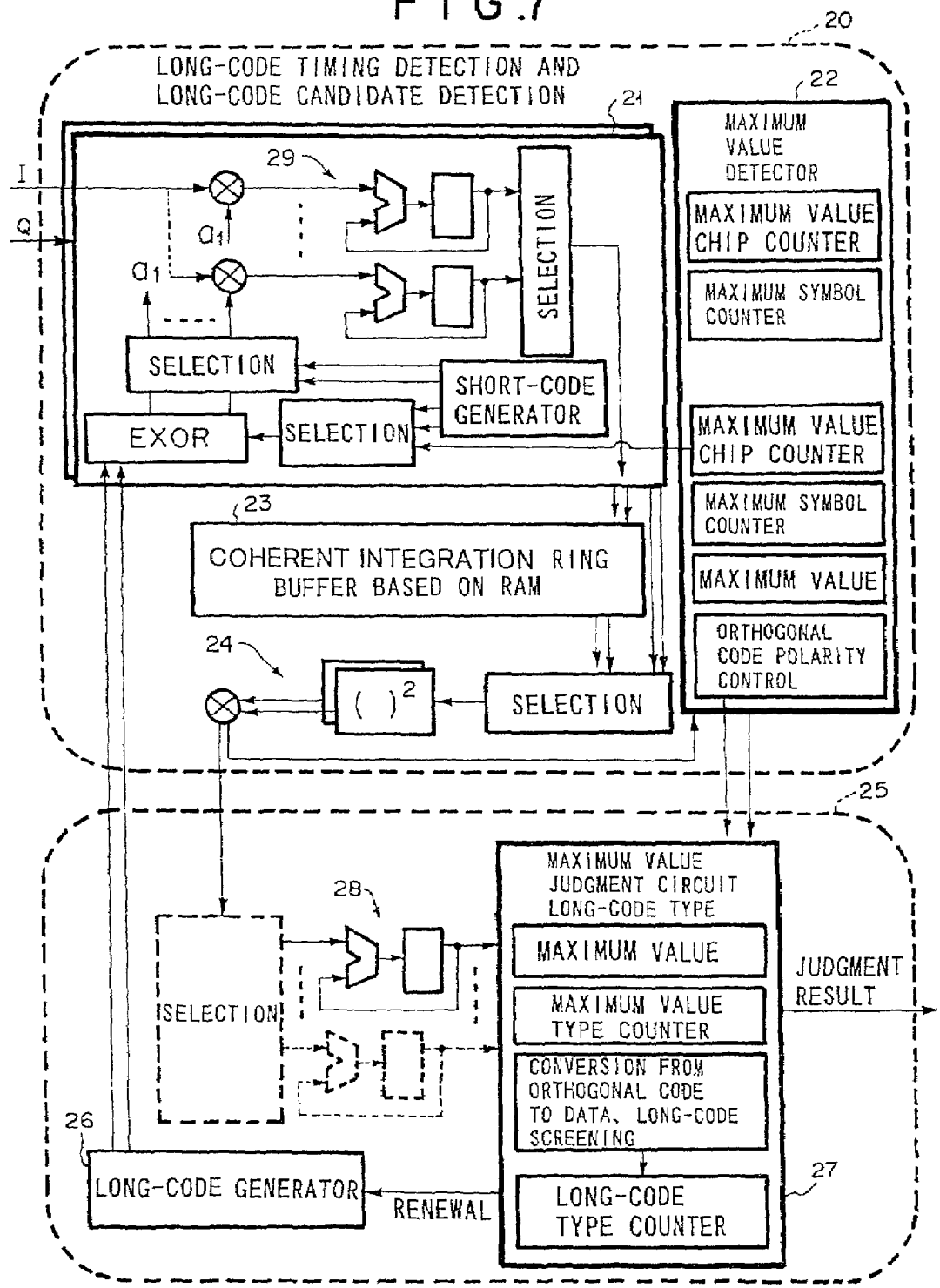
FIG. 7 is a block diagram showing the overall cell search containing a long-code identification circuit.

FIG. 7 is a block diagram showing the overall cell search containing identification of the long code. In FIG. 7, long-code timing detection and long-code candidate detection 20 detects the type of the orthogonal code and the position thereof, that is, the timing of the long code on the basis of the combination of the polarities of the above orthogonal codes. A correlator 21 has a short code generating circuit therein, and outputs a correlation value obtained by a correlator 29 to an in-phase adding ring buffer based on a RAM. The ring buffer based on the RAM implements the same function as shown in FIG. 1 while reducing the hardware scale, and the coherent integration of the combination of the possible polarities of the orthogonal codes is performed by an orthogonal code control circuit provided in a maximum value detection circuit 22.

The coherent integration value of the I-system, the Q-system thus obtained is converted to power in a square sum circuit 24, and the result is output to the maximum value detection circuit 22. The maximum value detection circuit 22 has a chip counter and a symbol counter, and registers the chip position and the symbol position having the maximum value, and the polarity of the orthogonal code at that time into a maximum register. Further, the finally-remaining value is output to long code identification 25.

The long-code identification 25 performs the data conversion from the orthogonal code on the basis of the information transmitted from the long-code timing detection and long-code candidate detection 20 to detect the long-code screening information. It identifies the long code inherent to the base station on the basis of the screened information, The screened information is transmitted to a sequential long-code generating circuit 26, and detects the correlation value by a long-code correlator 28. On the basis of the detection result, a maximum judgment circuit 27 judges the maximum correlative code as the long code.

FIG. 8 shows the details of the in-phase adding ring buffer based on the RAM. Information which is subjected to despread coding by a matched filter or a serial/parallel mixed correlator 31 is output to the in-phase adding ring buffer 33 based on the RAM. The in-phased adding ring buffer 33 based on the RAM can freely set the polarity to be added under the control from the external, and the coherent integration value corresponding to the polarity is output to each of the I-system and the Q-system. The maximum value of the square sum thereof is detected by the maximum value detection circuit 32.

FIG. 9 shows the coherent integration when there is a frequency deviation in carrier between a mobile station and a base station, and the correction is applied by the rotational feathers corresponding to an advance frequency (f+δf), a synchronization frequency (f) and a delay frequency (f−δf) at the symbol addition time. The correlative comparison target can be accurately provided with ROM tables of sine and cosine. However, FIG. 9 shows a case that a correlative comparison target for which the frequency deviation is corrected by a simple circuit with no ROM table is provided, and the phase rotation due to the frequency deviation between symbols is set to π/2 with the advance frequency and −π/2 with the delay frequency, and they are implemented by the addition and the subtraction respectively.

FIG. 10 shows a case where the polarities based on the orthogonal code for m=4 are set to ++++. As show in FIG. 10, this is implemented by the correlative comparison addition and subtraction of the coherent integration at the carrier frequency deviation time.

As described above, according to the high-speed cell search system for CDMA of the present invention, the identification or screening of the long code can be performed by the L-time repetition of the long-code mask symbols of M, and at the same time the coherent integration is performed over the M symbols. Therefore, the long code candidates can be screened at an early stage to shorten the initial synchronization time, thereby providing an excellent CDMA system.

Further, the present invention is greatly effective to shorten the search time even under such severe environments inherent to the mobile communication that Rake synthesization is not usable for the initial synchronization just after a source power is turned on, the transmission power is dispersed due to multipath, resulting in reduction of the signal component after the despread coding, the detection must be performed with being accompanied with the carrier phase shift, etc.

According to the present invention, each of the I-system and the Q-system is subjected to the coherent integration to enhance SNR, and then the square sum of I, Q is taken to judge the orthogonal code on the basis of the value of the square sum. Therefore, the present invention is applicable to orthogonal decoding.

According to the present invention, the content is renewed every symbol rate by the M-tap ring buffer which can perform the coherent integration with the polarity of the orthogonal code, and the orthogonal code is identified on the basis of the addition result. Therefore, there can be provided a search circuit which is suitable to reduce the hardware and save power consumption.

Further, according to the present invention, a code having sharp auto-correlation such as a Barker sequence or the like is used to specify the position of the frame of the M symbols. Therefore, no erroneous recognition is made on a correlation which appears every symbol, and thus the search time can be shortened.

The present invention is applicable to the serial search, the parallel search and the serial/parallel mixed search, and the parallel degree, that is, the search time can be selected in accordance with the circuit scale which can be implemented. Therefore, the design can be made flexible.

According to the present invention, the redundancy can be provided to the data constructed by the L-time repetition of the orthogonal code based on the M symbols, thereby restoring the data for specifying the long code which is defected due to fading or the like. Therefore, the retry times of search can be reduced, and the search time can be shortened as a whole.

Further, the present invention needs to establish the synchronization of the spreading code sequence before the initial synchronization in the mobile station, that is, the carrier and clock synchronization is established. However, even when there is a carrier frequency deviation, the high-speed search can be performed by the coherent integration corresponding to the frequency deviation with a relatively small scale circuit.

Although the present invention has been shown and described with respect to best mode embodiments thereof, it should be understood by those skilled in the art that the foregoing and various other changes, omission, and additions in the form and detail thereof may be made therein without departing from the spirit and scope of the present invention.

What is claimed is:

1. A high-speed searching circuit for use in a CDMA cellular system having a plurality of mobile stations and a plurality of base stations, which comprises:
   means for generating a plurality of short codes which are orthogonal with each other;
   means for receiving data containing one of said plurality of short codes and a long code inherent to one of said plurality of base stations;
   correlators for correlating the received data with said plurality of short codes to detect said one of said plurality of short codes contained in said received data; and
   means for screening candidates for the received long code on the basis of the detected short code.

2. A mobile station for use in a CDMA cellular system having a plurality of mobile stations and a plurality of base stations, which comprises:
   means for generating a plurality of short codes which are orthogonal with each other;
   means for receiving data containing one of said plurality of short codes and a long code inherent to one of said plurality of base stations;
   correlators for correlating the received data with said plurality of short codes to detect said one of said plurality of short codes contained in said received data; and
   means for screening candidates for the received long code on the basis of the detected short code.

3. A CDMA cellular system having a plurality of mobile stations and a plurality of base stations,
   each of the base stations comprising:
   means for transmitting, to said plurality of mobile stations, data containing one of a plurality of short codes which are orthogonal with each other and a long code inherent to the base station; and
   each of the mobile stations comprising:
   means for generating a plurality of short codes which are orthogonal with each other;
   means for receiving said data containing one of said plurality of short codes and the long code;
   correlators for correlating the received data with said plurality of short codes to detect said one of said plurality of short codes contained in said received data; and
   means for screening candidates for the received long code on the basis of the detected short code.

4. A method of searching codes used in a CDMA cellular system having a plurality of mobile stations and a plurality of base stations, which comprises the steps of:
   generating a plurality of short codes which are orthogonal with each other;
   receiving data containing one of said plurality of short codes and a long code inherent to one of said plurality of base stations;
   correlating the received data with said plurality of short codes to detect said one of said plurality of short codes contained in said received data; and
   screening candidates for the received long code on the basis of the detected short code.

5. The high-speed searching circuit according to claim 1, wherein:
   each of said plurality of short codes includes a plural M symbols which are spread spectrum symbols;
   said M symbols have combinations of the polarities corresponding to said short codes; and
   said correlators have despreading means to generate M symbols data.

6. The high-speed searching circuit according to claim 5, wherein each of said correlators further comprises adders for adding said M symbols data in an in-phase component and a quadrature component; and
   an orthogonal vector which is received on the basis of the sum thereof and the maximum value of the amplitude component is specified.

7. The high-speed searching circuit according to claim 5, wherein each of said correlators further comprises an M-tap ring buffer for adding said M symbols data in an in-phase component and a quadrature component in accordance with the polarities corresponding to said short codes, wherein:
   the content of said M-tap ring buffer is renewed at a symbol rate; and
   the addition result is used to specify an orthogonal vector.

8. The high-speed searching circuit according to claim 5, wherein a Barker sequence is used to specify the frame position of the M symbols.

9. The high-speed searching circuit according to claim 1, wherein redundancy is provided to codes which are formed by L-time repetition of an orthogonal vector to provide a function of restoring a portion which cannot be detected.

10. The high-speed searching circuit according to claim 5, wherein, in the coherent integration of the M symbols, a sequence which is weighted and polarized on the assumption of the carrier frequency is prepared, and the maximum one is selected on the basis of the correlation thereof, thereby supporting coherent integration having frequency deviation.

11. The mobile station according to claim 2, wherein:
   each of said plurality of short codes includes a plural M symbols which are spread spectrum symbols;
   said M symbols have combinations of the polarities corresponding to said short codes; and
   said correlators have despreading means to generate M symbols data.

12. The mobile station according to claim 11, wherein each of said correlators further comprises adders for adding said M symbols data in an in-phase component and a quadrature component; and
   an orthogonal vector which is received on the basis of the sum thereof and the maximum value of the amplitude component is specified.

13. The mobile station according to claim 11, wherein each of said correlators further comprises an M-tap ring buffer for adding said M symbols data in an in-phase component and a quadrature component in accordance with the polarities corresponding to said short codes, wherein:
   the content of said M-tap ring buffer is renewed at a symbol rate; and
   the addition result is used to specify an orthogonal vector.

* * * * *